United States Patent [19]

Dumbaugh

[11] Patent Number: 4,899,669
[45] Date of Patent: * Feb. 13, 1990

[54] VIBRATING APPARATUS AND METHOD IMPROVEMENTS FOR PROVIDING CONTINUOUS FLOW OF REFUSE DERIVED FUEL TO FIRE POWER PLANTS

[75] Inventor: George D. Dumbaugh, Louisville, Ky.

[73] Assignee: Kinergy Corporation, Louisville, Ky.

[ * ] Notice: The portion of the term of this patent subsequent to Oct. 4, 2005 has been disclaimed.

[21] Appl. No.: 356,255

[22] Filed: May 24, 1989

[51] Int. Cl.$^4$ .............................................. F23H 5/18
[52] U.S. Cl. ................................. 110/101 C; 110/186; 110/101 CF; 110/347; 198/762; 198/771
[58] Field of Search ........ 110/101 R, 101 C, 101 CF, 110/108, 293, 186, 347; 198/762, 771

[56] References Cited

U.S. PATENT DOCUMENTS

| | | | |
|---|---|---|---|
| 3,178,068 | 4/1965 | Dumbaugh | 222/161 |
| 3,251,457 | 5/1966 | Dumbaugh | 198/220 |
| 3,261,592 | 7/1966 | Dumbaugh et al. | 259/2 |
| 4,774,893 | 10/1988 | Dumbaugh | 110/101 C |
| 4,844,289 | 7/1989 | Dumbaugh | 110/101 C |

OTHER PUBLICATIONS

Bulk Solids Handling, vol. 4, No. 1, Mar. 1984, reprint of article by G. D. Dumbaugh, "The Evolution of the First Universal Vibratory Drive System for Moving and Processing Bulk Solid Materials", pp. 125–140.
Resource Recovery, No. 3, Sep. 1987, Article "From Cash Burner to Trash Burner", front cover sheet and pp. 5–10, 58 and 59, by Michael D. Long.
Solid Waste & Power, Feb., 1987, Article "RDF: A Practical and Finally Proven Alternative", pp. 16–22, by D. E. Hill.

Primary Examiner—Henry C. Yuen
Attorney, Agent, or Firm—Lee, Mann, Smith, McWilliams & Sweeney

[57] ABSTRACT

The apparatus and method are improvements over the refuse derived fuel (RDF) handling system disclosed in applicant's U.S. Pat. No. 4,774,893, in which the activated bins are equipped with centerless baffles made up of a plurality of stub type internal baffles affixed cantilever fashion to the bin side walls at predetermined levels downwardly of the bin, with the baffles having increased length as the levels of same approach the bin discharge outlet, that avoid the formation of vertical bridges building up from the top baffle through the bin inlet to clog and feed of the RDF to the respective bins, the use of cycle type operation or pulsing for the vibrating feeder drives on start up of the system to eliminate vertical bridging up from the feeder trough into and through the activated bins supplying same and insure the steady low feed rate required while the power plant furnaces involved are brought up to temperate, and to provide the system vibrating feeders with an inclined ramp type obstruction upstream but adjacent the feeder trough RDF discharge outlet to the furnace fuel feed chute serviced by same to insure that the RDF supplied to the furnace feed chute was conveyed solely by vibration, whereby the tendency of some furnace fire chambers to operate at negative pressure, which can result in the loss of control of the discharge rate of the feeder servicing same, is not a factor in the supply of the RDF to the furnace fire chamber.

19 Claims, 3 Drawing Sheets

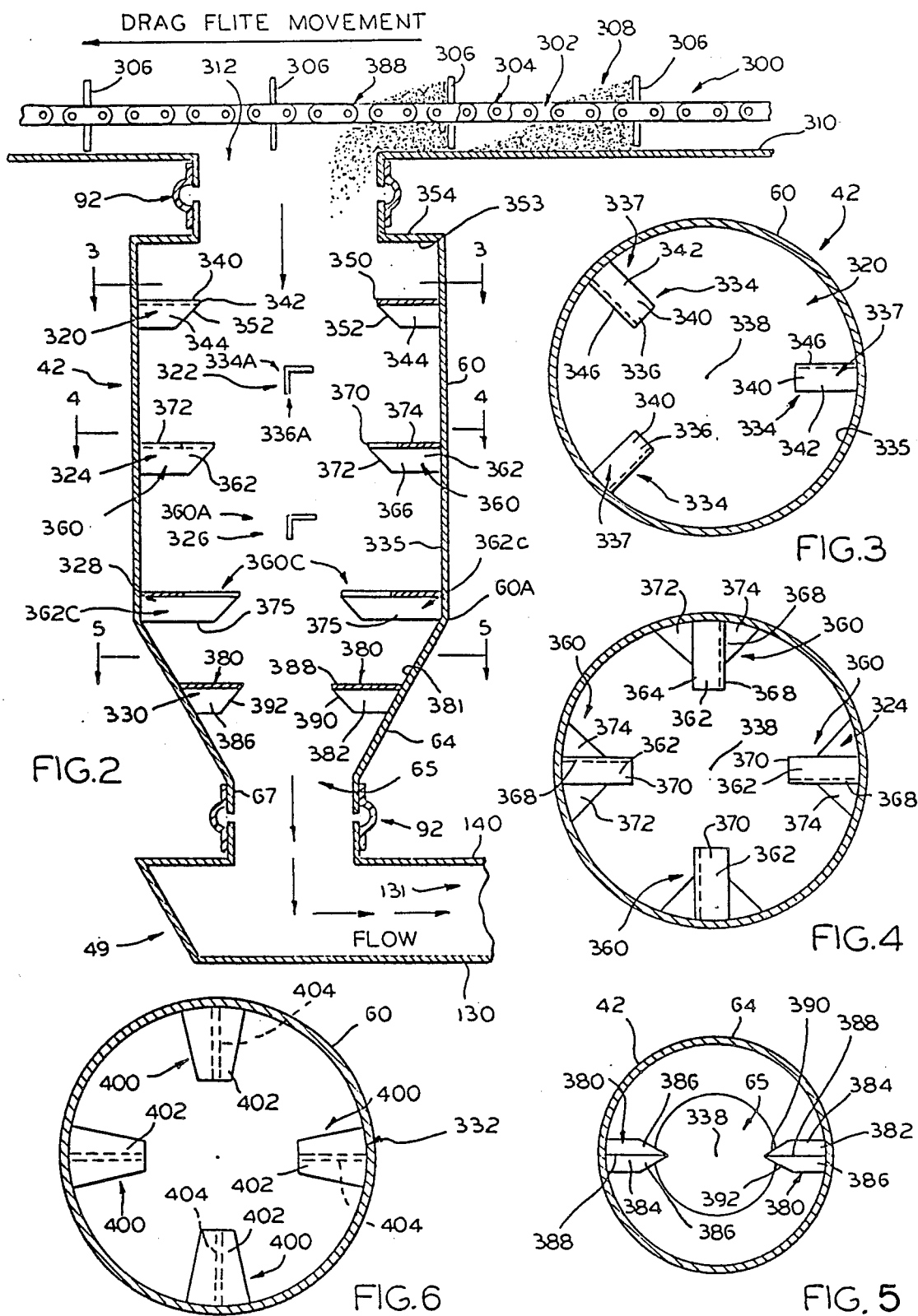

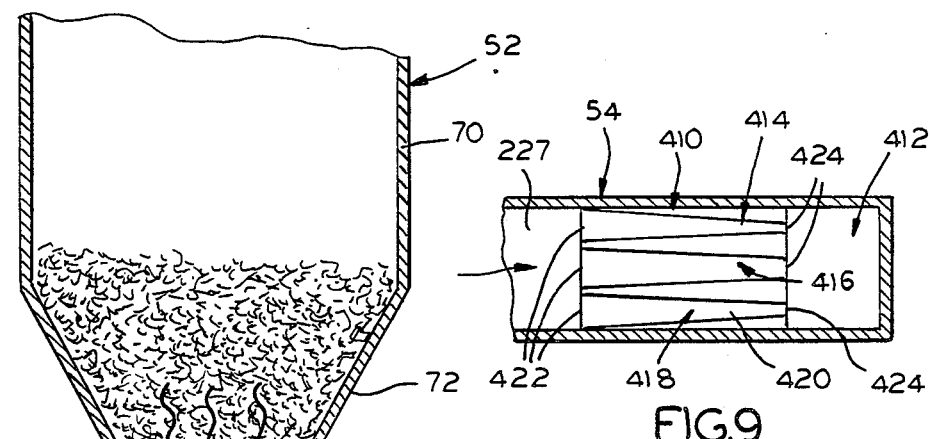
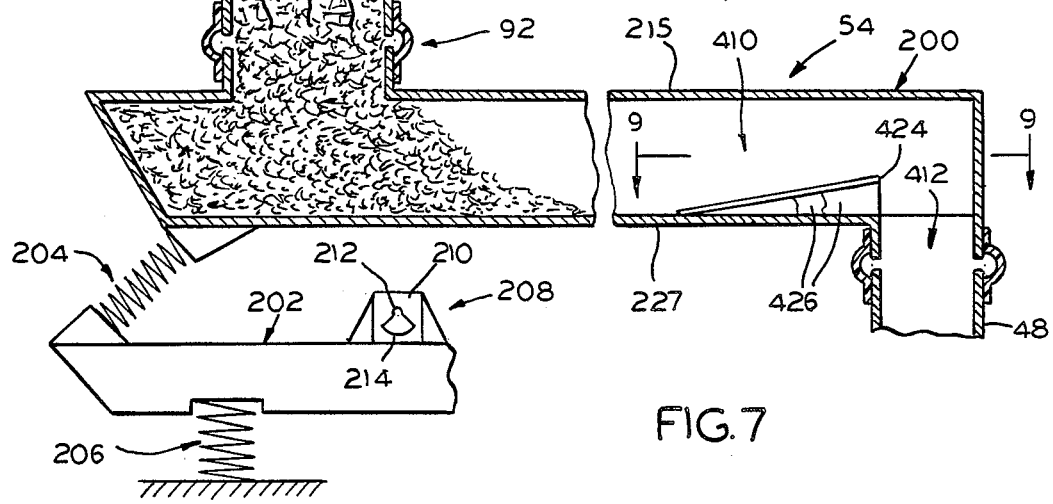
FIG. 9
FIG. 7
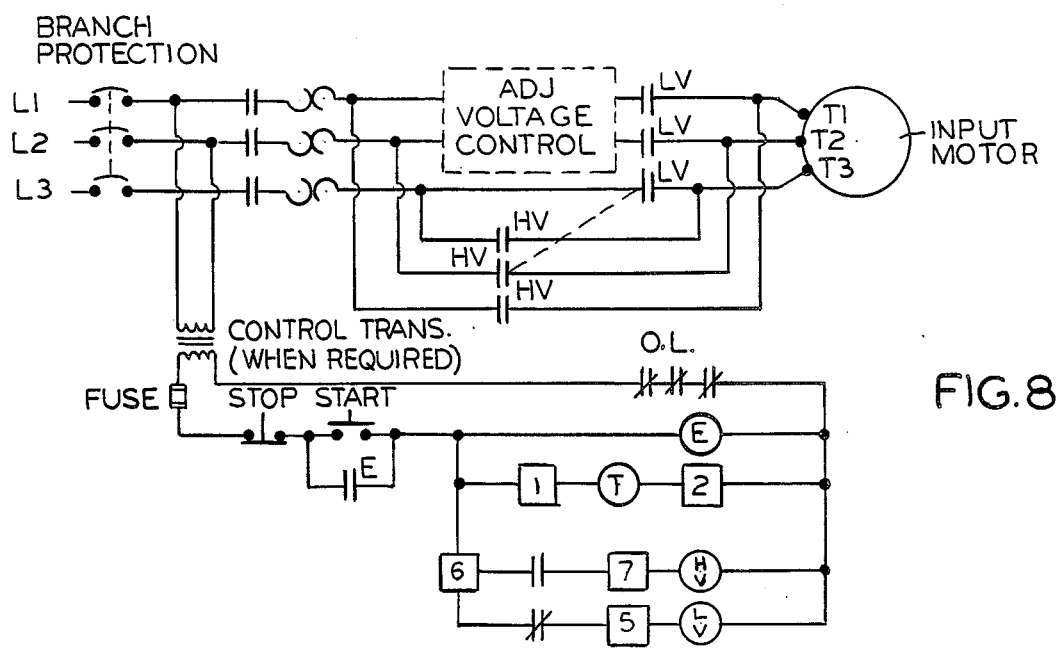
FIG. 8

VIBRATING APPARATUS AND METHOD IMPROVEMENTS FOR PROVIDING CONTINUOUS FLOW OF REFUSE DERIVED FUEL TO FIRE POWER PLANTS

This invention relates to a system of handling refuse derived fuel (RDF) for supplying same to RDF fired power plants for purposes of generating heat for forming steam, for heating and electricity providing functions.

More particularly, the invention relates to improvements in the RDF system disclosed in the Applicant's U.S. Pat. No. 4,774,893, granted Oct. 4, 1988, which in supplying RDF to RDF fired power plants, results in the fuel feed to the plant furnace being steady, uniform, and pulsation free, with the RDF being continuously supplied to the furnace fire chamber or pit in a fluffed condition for maximized heat generation purposes for burning, and at a volume rate that is in proportion to the pressure or temperature sensed within the furnace boiler, with the system involved being free from manual cleaning requirements and RDF return conveyor requirements.

Refuse derived fuel plain and simply is municipal solid waste made up of garbage and trash picked up by collection vehicles operated by municipal solid waste disposal services.

The nature of RDF makes the handling of same for any purpose extremely difficult. For instance, as disclosed in said patent, its density is low, its moisture content varies, and it is made up of irregularly shaped particles. RDF basically consists of burnable trash and garbage (of both content) that normally, for use as a fuel, is shredded to define individual pieces of a specified nominal size, such as six inches or less. This type of matter includes paper, cardboard, rags, pieces of wood, garbage such as banana peelings, apple cores, other normally edible vegetables and fruits that have been disposed of, normally edible meats that have been disposed of, and other items normally found in trash or garbage such as crushed aluminum cans, recording tapes, coat hangers, electrical wire, or the like, just to mention a few of such items.

For many years the long familiar common way to dispose of so-called municipal solid waste has been to bury same in land fills, but it is now common knowledge that land fills are not only becoming scarce in terms of availability, but previously filled land fills are frequently identified as the culprits for contaminating water in the areas in which they are located.

Prior to the invention of Applicant's said patent, the then existing RDF handling equipment employed for this purpose had been found to be not suitable for various reasons that the Applicant determined related to the manner and the amount of the RDF that is to be supplied to the furnace feed chute for combustion purposes, and the fact that the RDF handling systems suggested prior to the invention of the Applicant's said patent required that the equipment involved be shut down regularly, or at least irregularly, for cleaning purposes if the overall system was to continue operating with reasonable heat generation.

A requirement that has now become mandatory for RDF fired power plants is that the RDF be supplied to the plant furnace fire chamber or pit in a continuous, steady basis, free of pulsations or minute interruptions. As disclosed in the Applicant's said patent, auger type feeders innately provide a pulsating type of discharge since their output is sinusoidal, and "drag" type conveyors define pockets to provide for the fuel flow with similar pulsation results due to the fact that the moved RDF fuel tends to agglomerate in the aft portion of the individual pockets involved, causing the discharge output of such conveyors to "pulse" slightly. It is these minute "pulses" of the auger and drag type conveyors that are to be avoided to insure that the RDF feed to the furnace fire chamber is continuous. Furthermore, when RDF is pushed forward in either auger or drag-type conveyors, the RDF involved tends to inherently compress or to "wad", or, in other words, compact. It is well known that RDF, when it is presented in the furnace fire chamber pit, should be very loose and thus "fluffed" to provide for effective burning in the furnace and maximized BTU generation per pound of RDF burned.

It has also been found that auger and drag type conveyors in acting to feed the RDF material become fouled with some of the components of the RDF material involved, such as the various forms of ribbons, dictaphone tapes, music tapes, electric wires or cable, and the like, wrapping around the shafts of augers and fouling drag conveyor equipment component parts. This fouling heretofore has required complete shut down of the system for manual cleaning, on at least on an irregular basis.

The invention of the Applicant's said patent is concerned with a system of handling RDF employing vibrating equipment, which system keeps the RDF "unwadded" or "fluffed", eliminates any accumulation on the vibrating equipment involved, of the long stringers in the fuel that have been previously encountered, and thus does not require any shut down of the system for manual cleaning, and which stores at the plant, discharges from the storage site, and feeds automatically, the RDF to the furnace fire chamber or pit in response to a signal generated within the furnace boiler itself that may be based on pressure, temperature or any other suitable criteria.

A primary object of the present invention is to provide a system of handling RDF that comprises methods and apparatus for making it practical to fire power plants with RDF by providing for handling of RDF at the plant in supplying same to the plant furnace or furnaces in the form of, despite the variant and unlikely nature of RDF insofar as acting as a fuel is concerned, a steady, pulse-free flow, conditioned to constitute the RDF as it is presented in the furnace fire chamber to burn with maximized efficiency, which apparatus does not require regular or even irregular manual cleaning of the fuel conveying equipment involved. The term "handling", in this connection, means receiving, storing and discharging, distributing and feeding of the RDF.

Another important object of the invention is to provide the activated bins of the system with succeeding levels of flow enhancing internal baffles of "stub" configuration that are in effect "centerless" in nature, unconnected laterally thereof at each level, and of increasing length from level to level in the direction of said bin discharge, to avoid the formation of vertical bridges that all to frequently tend to build up from the activated bin top baffle of the center located cone type, through the bin inlet, to clog the feed of the RDF to the bin, for some types of conveyors that are, for instance, of the "drag" type that, contrary to Applicant's said patent, are employed to supply RDF to the bin.

Another principal object of the invention is to arrange the actuating mechanism for the system vibrating feeders for cycle type operation or "pulsing" to eliminate, while the power plant furnace serviced by the vibrating feeder involved is brought up to operating temperature, vertical bridging up of the RDF from a feeder trough into and through the activated bin supplying the feeder trough in question, and insure the steady low feed rate required for furnace start up.

Another principal object of the invention is to provide the vibrating feeders that service the furnace fuel chutes involved, in addition to the "fluffing" ramps disclosed in Applicant's said patent, with an inclined ramp type obstruction that is upstream but closely adjacent the feeder trough RDF discharge outlet to overcome the tendency of some furnaces to operate at negative pressure on start up, which can result in loss of control of the feeder discharge rate.

In accordance with the present invention, the system of handling RDF involved contemplates equipping power plants to be fired with RDF, basically in accordance with the disclosure of the Applicant's said Pat. No. 4,774,893. As disclosed in said patent, from the overall method standpoint the municipal solid waste forming the RDF is collected and deposited at the RDF fired plant, by way of the RDF being dumped on to the so-called "tipping" floor by individual vehicles typically employed to collect the municipal garbage and trash. The municipal solid waste involved is then conventionally shredded and usually passed under an electromagnet to remove most of the ferrous metal.

In the practice of the invention of the Applicant's said patent, the RDF that has been shredded to the indicated predetermined nominal size and usually has had the various ferrous metals removed therefrom, is applied to and is stored in a large activated bin that provides the needed primary surge capacity for full storing the RDF as it is received from the indicated shredding and ferrous metal removal processing. The indicated relatively large activated bin that serves as the primary surge storage means of the system is located in the plant to serve one or more of the plant furnaces, which storage activated bin when vibrated as disclosed in said patent discharges the RDF into one or more vibrating conveyors, each have a so-called sub-resonant tuned spring vibrator drive system with "free force" input that conveys the RDF at a flow rate that does not significantly deplete the RDF stored in the primary activated bin, to one or more RDF feed trains disposed at the locale of the plant furnace that comprise at least one but can be two metering activated bins that are each capable of supplying a quantity of the RDF to a vibrating feeder. Such vibrating feeders also each have the so-called sub-resonant tune spring vibratory drive system with "free force" input, with the vibrating feeder flow path defined by its trough including one or more devices to keep the RDF in a fluffy state as it approaches the vibrating feeder discharge outlet for application to the furnace fire box or pit feet chute served by same.

In accordance with the present invention, the system activated bins have internal baffling of the "centerless" type comprising baffles of stub configuration that are arranged in vertically spaced coplanar sets at succeeding levels within the bin in the direction of bin discharge, of which the stub baffles thereof are anchored cantilever fashion to the inner side wall of the bin involved without lateral connection, and with the respective stub shaft sets being oriented relative to the central vertical axis of the bin involved so that they are staggered with respect to the stub baffle sets above and below same, and with the stub baffles of adjacent baffle sets increasing in longitudinal direction, toward the center of the bin, with reference to the vertical positioning of such sets within the bin. This type of baffle arrangement has been found to avoid the formation of vertical bridges that tend to build up when the baffles are of the center located, inverted conical type disclosed in said patent, namely from the top baffle of the bin through the bin inlet to clog infeed of the RDF to the bin, when the bin involved is supplied with RDF by, for instance, a "drag" type conveyor (contrary to Applicant's said patent).

Further, the vibrating drives for the vibrating conveyors and feeders involved are arranged to be of the cycle type operation, or "pulsing" type, so that during the extended period when the furnace boilers must be brought up to temperature (on furnace "start up") the vertical bridging up from the conveyor or feeder trough into and through the activated bin supplying same may be eliminated to insure the steady low feed rate required while the power plant furnace is being brought up to temperature.

Also, the vibrating feeders of the system are each provided with an inclined ramp type obstruction located upstream but closely adjacent the feeder trough RDF discharge outlet (to the furnace feed chute) so that control of the discharge rate of the feeder would not be lost control of by the tendency of some furnace fire chambers to operate at negative pressure that tends to draw the very light weight RDF down the feeder trough and into the boiler feeder chute under what are in effect slight vacuum conditions.

Other objects, uses, and advantages will be obvious or become apparent from a consideration of the following detailed description and the application drawings in which like reference numerals indicate like parts throughout the several views.

In the drawings:

FIG. 1 is a fragmental perspective view similar to the last Figure of said U.S. Pat. No. 4,774,893, illustrating a simplified overall embodiment of the basic system involved, and is presented as a generic representation of the basic features of the Applicant's RDF handling system and method and apparatus involved, to which the improvements of the present invention have been applied under circumstances that have and will be indicated;

FIG. 2 is a diagrammatic vertical cross-sectional view through a diagrammatically illustrated activated storage bin and associated vibrating conveyor trough that are disclosed more specifically in the Applicant's said patent, illustrating several embodiments of a "centerless" internal baffle arrangement that are applied to the bin in accordance with the present invention, when the activated bin involved is supplied with RDF by a conventional overhead drag-flite type, horizontal conveyor, instead of a belt conveyor arrangement of the general type shown in FIG. 1 to overcome an RDF vertical columning problem that can develop using drag type conveyors for RDF supply;

FIG. 3 is a diagrammatic horizontal cross-sectional view taken substantially along line 3—3 of FIG. 2 illustrating in plan one form of stub baffle employed to make up the uppermost baffle arrangement of the bin of FIG. 2, showing also in dashed lines the second level baffle arrangement of FIG. 2, to bring out the staggered relation of the bin two top baffle arrangement levels;

FIG. 4 is a horizontal cross-sectional view taken substantially along line 4—4 of FIG. 2, illustrating the stub type baffle arrangement employed at the third baffle arrangement level of the bin of FIG. 2, with the fourth baffle arrangement level being shown in dashed lines to bring out the staggered relation of same to the baffle arrangement shown in plan in FIG. 4;

FIG. 5 is a horizontal cross-sectional view taken along line 5—5 of FIG. 2 illustrating in plan the stub type baffle arrangement employed in the discharge cone type outlet of the bin of FIG. 2, in accordance with the present invention;

Figure 1:
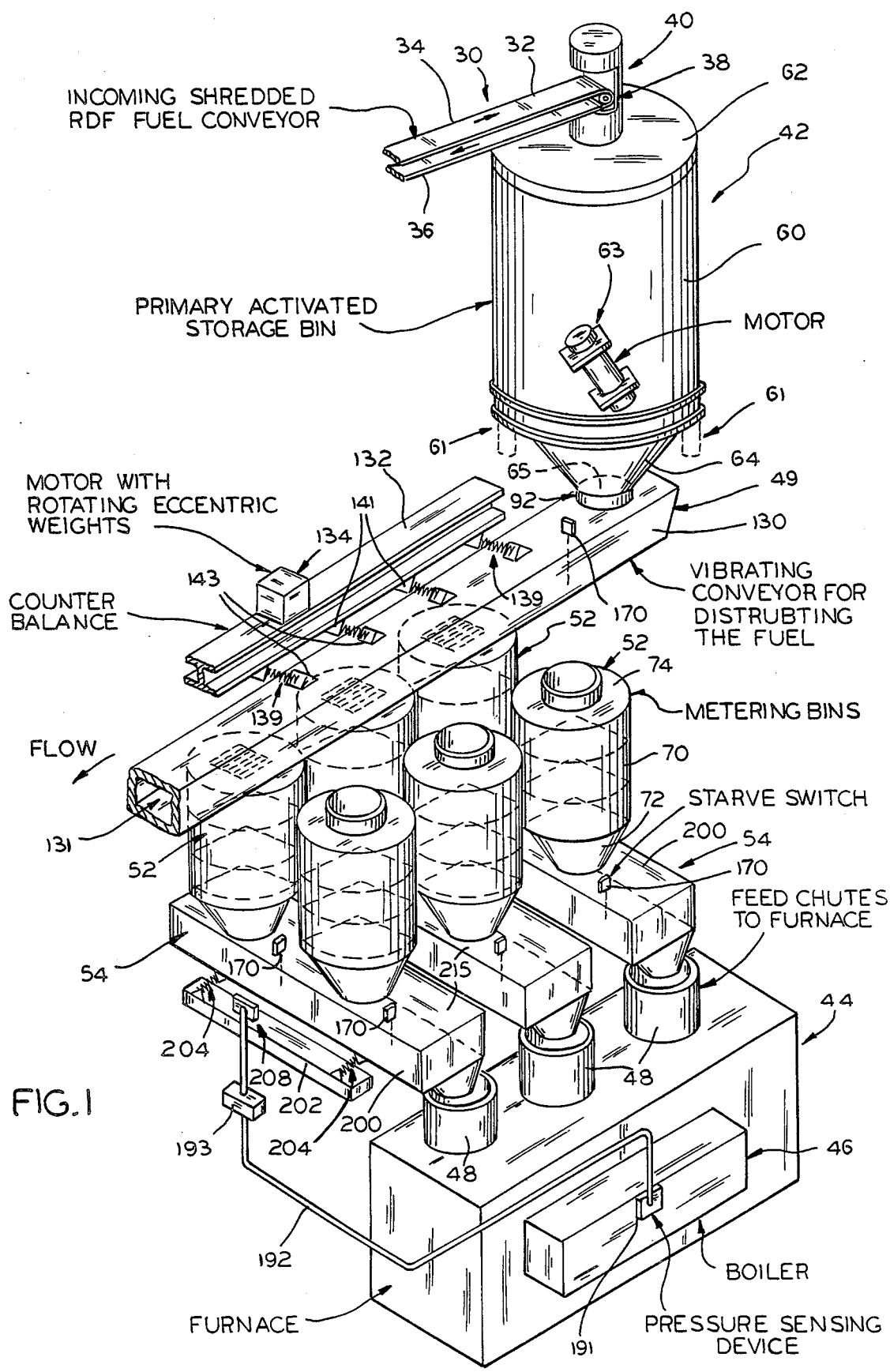

FIG. 6 is a view generally similar to that of FIGS. 3–5, illustrating in plan another form of stub type baffle arrangement for the bin of FIG. 2 that may be employed at any baffle level indicated in FIG. 2, it being understood that the stub baffles involved in the arrangement of FIG. 6 will extend toward the axial center of the baffle preferably in proportion to the level of the baffle arrangements shown in FIG. 2 in the direction of discharge from the bin;

FIG. 7 is a diagrammatic vertical sectional view through an activated metering bin of the type disclosed in Applicant's said patent, and the vibrating feeder which receives the RDF from same, diagrammatically indicating the vertical bridge or column that can be formed at the vibrating feeder trough and that extends up into the activating bin involved, where the RDF conveying speed of the vibrating feeder is very slow, thus providing virtually a dribble type feed as when a furnace boiler serviced by the feeder is being brought up to temperature (which is done very slowly), diagrammatically indicating some of the feeder spring mounting and a part of the counter balance for the vibrating feeder as well as the flexible connections between the bin and the feeder trough, and between the feeder trough and the furnace fuel feel chute, and the ramp type obstruction shown in plan in FIG. 9;

FIG. 8 is an electrical schematic, illustrating a motor control arrangement that provides for adjustable output of the feeder with automatic "step" type control for use with automatic "pulsing" or "max-min" feeding applications, which is adapted for the arrangement of FIG. 7 to eliminate the vertical bridge or column shown in FIG. 7, particularly when the boiler of the furnace serviced by the feeder is being brought up to normal operating temperature; and FIG. 9 is a plan view taken substantially along line 9—9 of FIG. 7 illustrating a ramp type obstruction for the vibrating feeder trough of FIG. 7 that is provided to maintain the control of the vibrating feeder RDF discharge rate where the boiler operates under negative air pressure (where a slight vacuum may be present), to avoid drawing the light weight RDF down the feeder trough and into the boiler fuel feed chute by air flow rather than feeding same by vibration.

However, it is to be distinctly understood that the drawing illustrations referred to are provided primarily to comply with the disclosure requirements of the Patent Laws, and that the invention is susceptible of modification and variations that will be obvious to those skilled in the art, depending on the particular needs of the power plant to be serviced by the invention, and which are intended to be covered by the appended claims.

GENERAL DESCRIPTION

The Applicant's basic system is, of course, more fully disclosed in U.S. Pat. No. 4,774,893, granted Oct. 4, 1988 (the entire disclosure of which is incorporated herein by this reference).

FIG. 1 corresponds to FIG. 23 of said U.S. patent, and diagrammatically illustrates in a schematic way the basic nature of the Applicant's RDF handling system and method and apparatus involved. As indicated in FIG. 1 of the instant application, the RDF is applied to a suitable conveyor 30, which in the showing of FIG. 1 is in the form of a conveyor belt 32 that is suitably trained to define upper run 34 and lower or return run 36, with the belt 32 being trained over suitably journaled end pulley 38 that effects, in accordance with the specific belt conveying arrangement of said patent, deposit or dropping of the RDF into suitable intake conduiting 40 that communicates with the interior of a relatively large articulated storage bin 42 that provides a primary surge capacity storage of the RDF supplied to the system of the embodiment illustrated in FIG. 1, in light of the fact that the RDF is periodically delivered in the manner indicated to the plant serviced by the invention and processed for application to the system of the Applicant's said patent, which system supplies such RDF fuel in the form of a steady feed to a plant furnace or furnaces, such as the furnace 44 diagrammatically illustrated in FIG. 1.

As disclosed in said patent, for any particular furnace 44, the RDF accumulated in storage activated bin 42 is discharged into an upside down type vibrating conveyor 49 that moves the RDF to the locale of the furnace 44 to be serviced by the system, at which locale are appropriately mounted a number of vibrating feeder trains 50 arranged in the manner disclosed in said patent, each of which includes at least one but often two metering activating bins 52 that are separately supplied by parallel fuel distributing vibrating conveyors 49, with such bins 52 singly or collectively supplying RDF as needed to the vibrating feeders 54 to provide a steady fuel flow to the respective vibrating feeders that convey the RDF to the respective furnace fuel chutes, as indicated in FIG. 1.

As disclosed in the Applicant's said U.S. patent, the quantative output of the individual vibrating feeders 52 is controlled through an arrangement that controls the voltage supplied to the alternating current motor 208 of the vibrating drive system involved in each vibrating feeder unit 54 in accordance with the Applicant's U.S. Pat. No. 3,251,457 (the disclosure of which is hereby incorporated herein by this reference), based on an electrical control arrangement sensing either the temperature, pressure, or other suitable condition within the boiler 46 that is to be heated by the burning of the RDF.

Aside from the improvements described herein pertaining to the centerless baffles, the activated bins 42 and 52 and associated parts may be basically conventionally arranged to be a single motor activator or a two motor activator, though modified as disclosed in said U.S. Pat. No. 4,774,893 with regard to their mounting of their activating motors. The Applicant's U.S. Pats. Nos. 3,178,068 and 3,261,592 are pertinent to the degree indicated by said U.S. Pat. No. 4,774,893, the disclosures of said U.S. Pats. Nos. 3,173,068 and 3,261,592 being hereby incorporated herein by this reference.

The relatively large primary storage activating bins 42 preferably have a capacity in the range of from about 1,000 cubic feet to about 3,000 cubic feet and define an upright vertical wall 60 that rests on suitable vibration isolators 61 (several of which are shown in phantom in FIG. 1), which may be of the rubber type, such as the type diagrammatically illustrated in the Applicant's afore mentioned prior U.S. Pat. No. 3,173,068. The bins 42 also include a suitable cover or top 62 to which the intake conduit 40 illustrated in FIG. 1 is suitably connected or affixed for discharge of the incoming RDF into the respective bins 42. At the lower end of the bin side wall 60 a suitable transitional discharge cone 64 of frusto-conical configuration is provided that, defines the usual bin discharge opening 65.

In the showing of FIG. 1, the large capacity activated bin 42 is shown to include a bin driving motor assembly 63 mounted on the exterior of the bin vertical side wall 62. My said U.S. Pat. No. 4,774,893 illustrates single motor bin activator arrangements or two motor bin activator arrangements for the system covered by said Patent, and the disclosure of that patent may be referred to for elucidation of this aspect of the system.

As to the smaller metering activated bins 52, it is suggested that they be of from about 100 to about 150 cubic feet in size and internal capacity. Each such bin 52 comprise vertical side wall 70 that is secured to a suitable discharge cone 72 that is of the familiar frusto-conical configuration, and defines the outlet 73 (see FIG. 7) of the respective bins 52, as well as suitable top 74.

The discharge opening 65 of the primary storage bins 42 are flexibly connected in any suitable manner, such as by employing conventional flexible connections 92, to the troughs 130 of the respective vibrating conveyors 49, while the troughs 130 of the respective conveyors 49 are also similarly flexibly connected, as by employing suitable connections 92, to the tops of the metering activated bins 52 (not shown but see the Applicant's said U.S. Pat. No. 4,774,892). The metering bins 52 are in turn similarly suitably flexibly connected, as by employing suitable flexible connections 92, to the vibrating feeders 54 that they service.

In this connection, it is preferred that the Applicant's RDF system of handling RDF fuel be enclosed throughout so as to be essentially dust free in operation.

As has been indicated, the smaller metering bins 52 are part of the individual RDF store-feed trains 50 for a particular furnace 44. In the diagrammatic showing of FIG. 1, three such trains 50 are illustrated, but in this view the left hand side of the apparatus is broken away for facilitating an understanding of the overall arrangement involved.

As disclosed in said U.S. Pat. No. 4,774,893, the vibrating conveyors 49 of the Applicant's system comprise basically the upside down vibrating conveyor arrangement offered by Kinergy Corporation of Louisville, Kentucky, as its Model No. KDC-60-HD(S), but modified as disclosed in Applicant's said U.S. Pat. No. 4,774,893.

As is typical of vibrating conveyors of this type, the conveyors 49 comprise a conveyor trough 130 that defines a feedway 131 for RDF being conveyed, with the trough 130 being below the vibrating conveyor counterbalance 132, and with the counterbalance 132 being suitably supported on conventional isolator units that are not illustrated in FIG. 1 hereof (but see FIG. 16 of said U.S. Pat. No. 4,774,893), and activated by motorized vibrator unit 134. The vibrating conveyor or conveyors 49 employed convey the RDF to the locale of the furnace 44 serviced by same, which may be up to 200 feet or so away from the primary storing activated bin 42 that services the furnace 44 in question.

A specific arrangement of the conveyor 49 modified as contemplated by said U.S. Pat. No. 4,774,893 is disclosed in said U.S. Pat. No. 4,774,893.

Said U.S. Pat. No. 4,774,893 also discloses the manner in which the vibration of both the bins 42 and 52 are controlled; as there disclosed, the invention of that patent contemplates that for each bin 42 and 52 a switch arrangement is interposed in the electrical system involved which will control the off-on operation of the bin vibrators, in terms of the amount of RDF being conveyed by the respective conveyors 49 serviced by the primary storage bins, or the respective vibrating feeders 54 serviced by the bins 52 in question. The control switches involved are the so-called "starve" switches 170 or the photocell arrangement of said U.S. Pat. No. 4,774,893, both of which are fully disclosed in said U.S. Pat. No. 4,774,893.

The respective vibrating feeders 54 that are associated with one or more of the metering activated bins 52 and the furnace fuel feed chute 48 in a train 50 involve a vibrating feeder arrangement that is basically the Kinergy Corporation vibrating feeder Model No. KDF-30-HDDT; thus, the feeder 54 includes the usual dust tight trough 200 articulated to the usual counter balance 202 by way of the usual steel coiled drive springs 204, with the counterbalance 202 resting on the usual isolator or mounting springs 206 (see FIG. 7). The counterbalance 202 carries the usual power input motor that is indicated at 208 including the usual motor housing 210 in which is mounted the driving motor and rotating shaft 212 that has the usual eccentrics 214 at either end of same, one of which is shown in FIG. 7. The vibrating feeder trough 200 includes a suitable cover 215 and is otherwise suitably enclosed so that the feeders 54 are dust free in operation.

The vibrating feeders 54 are each provided with an automatic feed control that is fully disclosed in the Applicant's said U.S. Pat. No. 4,774,893, this being diagrammatically illustrated in FIG. 1; thus, the furnace boiler 46 is equipped with a suitable conventional electrical signaling device 191 which generates an electrical signal of 4 to 20 milliamps in accordance with either pressure or temperature within the boiler that is generated. The unit 191 is electrically connected by suitable wiring 192 to SCR 193 appropriately secured adjacent the motor of the vibrating feeder motor assembly 208. If pressure within the furnace boiler is selected as the controlling medium to be sensed, the sensor 191 is arranged to send its maximum signal at a selected low pressure to increase the vibrating action of feeder 54 to increase the RDF feed to the furnace fire box in question, with the maximum pressure within the boiler that is to be permitted giving the four milliamp signal, whereby vibrating feeders 54 close down to provide a virtually zero feed into the furnace feed chute it services. The speed of RDF feed provided by the vibrating feeders 54 is thus varied automatically as the SCR 193 senses the signal generated by the pressure in the furnace boiler. As already indicated, temperature or any other suitable factor sensed within the furnace boiler can be alternately used for the same purpose. The sensors 191 are standard signal devices available with furnaces offered by, for instance, Babcock and Wilcox, and Riley-Stocker Corp., as disclosed in said U.S. Pat. No. 4,774,893.

Turning now to the showing of FIGS. 2-6 of the present application, the there illustrated bin 42 is shown to be supplied with RDF by conventional drag-flite type, horizontal conveyor 300, defining a pair of spaced apart endless chains 302 and 304 between which are connected, in equally spaced relation, a plurality of conventional spacer panels 306 defining spaced pockets 308 for RDF that is applied thereto upstream of bin 42 in any conventional manner, with the panels 306 assumed to be moved from the right to the left of FIG. 2 along horizontal guide plate 310 that is suitably formed to define RDF discharge outlet 312 that is suitably flexibly connected to the illustrated bin 42 by conventional flexible connection 92.

Bin 42 is assumed to be arranged for vibration as disclosed in Applicant's said U.S. Pat. No. 4,774,893 and is diagrammatically illustrated to be flexibly connected to the trough 130 of a conveyor 49 by suitable flexible connector 92 for discharge of RDF stored in the activated bin 42 into the conveyor 49 in accordance with the RDF conveying action disclosed in said U.S. Pat. No. 4,774,893.

The Applicant in applying his RDF handling system to power plants equipped with drag-flite type conveyors 300 for supplying the RDF to the storage bins 42 found that where the bins 42 were equipped with the centrally located cone type baffle arrangements disclosed in said patent of which inverted cones and sections of such are examples, and the supply of the RDF to the bins 42 was by way of operation of the drag-flite type conveyor 300, the RDF would form a vertical bridge or column from the top baffle through the bin 42 and its inlet, and up into the path of the conveyor 30. Of course, the drag-flites of the conveyor 300 continued to pass over the filled bin 42 as long as conveyor 300 continued to supply RDF to bin 42, and tended to create a very respectable downward force on the stacked up RDF within bin 42, which would compress and form a dense vertical column between the indicated top conical baffle and the conveyor 300 aligned with the vertical central axis of the bin 42. Operation of the bin vibration system failed to shake loose the packed RDF above the indicated top conical baffle.

The Applicant found that by equipping the bins 42 with the "centerless" baffle arrangements indicated in FIGS. 2-6, a significant discharging performance, added usable volume, and the necessary vertical velocity, of the RDF involved, down through the height of the activated bin 42, was obtained. The new baffle arrangements illustrated in FIGS. 2-6, even when the RDF was backed up into the outlet of the drag-flite conveyor 30, permitted the downward force generated by the drag-flites passing over the filled outlet of the conveyor 30 to actually help to thrust the RDF down through the open center of the bin 42 baffling and below same.

As indicated in FIGS. 2-6, the improved centerless baffling arrangements are indicated by reference numerals 320, 322, 324, 326, 328, and 330.

It is to be noted that the baffling arrangements involved in FIGS. 2-6 are made up of a plurality of coplanar related stub type baffles that in themselves, for each baffling arrangement, are cantilever mounted at the respective levels indicated, they are not laterally connected, and are thus independently of each other at each level they serve the bin to which they are applied as separate baffles, and they are of increased length in the direction of RDF discharge from bin 42.

Referring to FIGS. 2 and 3, it will be seen that the uppermost baffle arrangement 320 of bin 42 comprises three angle members 334 affixed, cantilever fashion, as by welding, to the inside surfacing 335 of the bin side wall 60, with each angle member 334 defining a baffle 336 of stub configuration and totally unconnected to the other angle members 334 of baffle arrangement 320, except by way of the side wall 60 of the bin 42. In the baffle arrangement 320, and as illustrated in FIGS. 2 and 3, the stub baffles 336 are in the form of angle members 336 spaced 120 degrees apart about the bin central vertical axis 338, with the respective angle members 334 each defining horizontal flange 342 and vertical flange 344 that are integrally joined together at the familiar angle member corner 346.

Assuming, for example, that the vertical height of bin wall 60 is seven feet, the internal diameter of wall 60 is four feet, and the bin outlet 65 is thirty inches in diameter, the baffling for bins 42 and the dimensioning of same is suggested as shown in FIGS. 2-6 and as indicated, below. Thus, the horizontal flanges 342 of the respective angle members 334 may be four inches in width and the respective vertical flanges 344 thereof may be three inches in width. Angle members 334 may be ten inches in length, measuring from the bin side wall inner surface 335 to the inner ends 340 thereof, with the angle members 334 at their inner ends 340 being formed to define an edging 352 along the vertical flange 344 that is approximately at an angle of 45 degrees relative to the plane of the horizontal flange 342 thereof. Angle members 334 of baffle arrangement 320 preferably are disposed so that their horizontal flanges 342 are in coplanar relation, with the plane thereof being approximately normally disposed relative to the axial center 338 of bin 42. The baffle arrangement 320 arrangement may be located approximately eleven inches down from the undersurface 353 of the top 354 of bin 42.

The baffle arrangement 322 of FIGS. 2 and 3 is the same as baffle arrangement 320 except that the angle members 334A making up same may be twelve inches in length and are in staggered positions relative to the stub baffles 336 of the baffle arrangement 320, about the vertical axis 338 of bin 42, so that the said stub baffles 336 of the baffle arrangement 322 are disposed intermediate of, and approximately respectively half way between, the corresponding angle members 334 of the baffle arrangement 320, as indicated in dashed lines of FIG. 3.

As indicated, the length of the stub baffles 336A of baffle arrangement 322 may be approximately one foot (measuring from the inner surfacing 335 of bin 42 toward the vertical central axis 338 of same). Baffle arrangement 322 may be located twenty-two inches from the inside surfacing of the bin surfacing 353.

The baffling arrangement 324 is illustrated in plan in the sectional view of FIG. 4, from which it will be seen that the stub baffles 360 that make up the baffle arrangement 324 are four in number, and are coplanar related, similar to the baffle arrangements 320 and 322. Each stub baffle 360 includes a centrally disposed angle member 362 comprising horizontal flange portion 364 and vertical flange portion 366 that are integral at corners 368, with the inner ends 370 of the respective stub baffles 360 being formed to define the angled edging 372 in the stub baffles 360 that is similar to the edging 352 of stub baffles 336. The angle members 362 are suitably affixed to the inside surfacing 335 of bin 42, cantilever fashion, as by employing welding techniques or the like, and extend radially of the bin vertical central axis 338, as in the case of the stub baffles 336 and 336A of the baffle arrangements 320 and 322.

In addition, the length of the stub baffles 360 may be thirteen inches, and baffle arrangement 324 is located approximately forty-four inches below the surfacing 353 of bin 42.

Also, the stub baffles 360 each include a wing at the sides of same in the form of the respective triangular plates 372 and 374, for greater width and load support area adjacent bin surface 335; in the case of the stub baffles 360 the respective plates 372 and 374 are fixed between the bin wall 60 and the respective angle members 362 in coplanar relation with the horizontal flange 364 of same (for this purpose welding techniques or the like may be employed).

The baffle arrangement 326 is similar to the baffle arrangement 324, except that the stub baffles 360A of same are angularly disposed relative to the stub baffles 360, baffle arrangement 324, about axis 338, so that in the downward direction (relative to bin 42 the stub baffles 360A will be disposed intermediate the stub baffles 360, as indicated in dashed lines in FIG. 4). The stub baffles 360A of arrangement 326 should have a length of fourteen inches.

The stub baffle arrangement 328 is similar to the stub baffle arrangement of FIG. 4, including the stub baffles 360C that are similarly configured to stub baffles 360 of baffle arrangement 324, and include the indicated angle plates 372 and 374 (which are aptly termed "wings"). However, in the baffle arrangement 328 the angle members 362C are of increased length over the length of the members 360, approximately fifteen inches being preferred for the illustrated bin 42. The stub baffles 360C are located at the "break line" 60A of the bin 42, with the vertical flanges 366C of the respective angle members 362C involved having their undersides 375 in coplanar relation with bin "break line" 60A.

Baffle arrangement 330, which is illustrated in plan in FIG. 5, is located in the illustrated embodiment approximately half way down the slant length of the bin transistion cone 64, and comprises a pair of opposed stub baffles 380 in the form of a pair of opposed angle members 382 suitably affixed, in open side down relation as by employing welding techniques, to the inside surfacing 381 of the bin transistion cone 64. The angle members 382 oppose each other, they are located approximately 180 degrees apart, as indicated by FIG. 5, and also they are directed radially of the vertical center axis 338 of the bin 42.

Further, the angle members 382 comprise the usual planar flanges 384 and 386 integrally united at corner 388, with the angle members 382 being oriented such that flanges 382 and 386 are inclined at approximately 45 degrees relative to the horizontal, and the flanges 382 and 384 are both formed to define angled edgings 390 and 392 that are angled by approximately 45 degrees relative to central axis 38. The angle members 382 are proportioned lengthwise thereof to project somewhat radially further toward axis 338 than the angle members 361C of stub baffle arrangements 328.

It will thus be seen that in each of the baffle arrangements illustrated and described with reference to the bin 42, each is made up of several stub baffles that are in coplanar relation transversely of the bin, they are cantilever mounted free of lateral connections therebetween, and they have their inner end portions increasingly approach the axis 338 in the direction of discharge from bin 42.

Another form of stub baffle arrangement that can be employed in connection with bin 42, for all the locations of the baffle arrangements shown in FIG. 2, is illustrated in FIG. 6, wherein the stub baffle 400 illustrated each comprise a plate 402 of trapezoidal configuration, extending in coplanar relation from the side wall 60 of the bin 42, with four of the plates 402 being illustrated in equally spaced relation, with the larger base margins of same being fixed to the bin inner surfacings 335 and 381, respectively, in the embodiment of FIG. 6, and being suitably braced relative to the bin 42, as by employing brace plates 404 that are in bracing relation between the undersides of the respective plates 402 and the side wall 60 of the bin 42. The stub baffles 400 may be varied in number, depending on the consistency of the RDF materials to be employed to the bin 42, and are increased in length for application to baffle arrangements that are located at different levels of the bin 42, downwardly thereof, as is the case with the baffle arrangements illustrated in FIGS. 2–5.

It will therefore be seen that the baffle arrangements of FIGS. 2–6 are all the "centerless" type, and in the sense that they are not laterally connected and stand as separate independent baffles from the side wall of the bin, and that they are of "stub" configuration. As such baffles are to comprise or be part of baffle arrangements that are to be located at consecutive levels of the bin 42 downwardly of same, the stub baffles involved at such levels are of increased length roughly proportioned to their adjacency relative to the discharge opening 65 of the bin.

Experience has shown that centerless type baffles of the forms illustrated in FIGS. 2–6 are preferred for RDF or other "flake" type materials, such as RDF paper, cardboard, ribbons, shredded plastic items, and the like where the particle size of the bulk solid material involved exceeds two inches in any given dimension (and of course is of the "flake" type). The number of levels of such internal baffles employed in any one bin, and the number of such baffles employed at any such level of same, will depend on the size of the bin involved.

The result is that, where RDF that is of a particle size exceeding two inches in any given dimension is supplied to storage activated bins 42 by equipment equivalent to the drag-flite conveyors 300, the vertical columning of the RDF within bin 42 will be avoided in favor of ready discharge of the RDF from bin 42 when it is vibrated in accordance with the Applicant's said U.S. Pat. No. 4,774,893.

While the same sort of stub baffling has not been shown applied to the metering activated bins 52, it is obviously within the scope of the present invention to do so where the indicated vertical columning of the RDF within the bins 52 is a problem, as where the RDF particle size is of the larger size indicated. Where the RDF particle size is less than two inches in any given dimension, or in other words, is of minus two inch particle size, invented cone type internal bin baffling will be satisfactory.

Referring now to the showing of FIGS. 7 and 8, and the vertical build up of the RDF from the vibrating feeder 54 into and through the metering activated bin 52, that has occurred where furnace "startup" is experienced, it has been found that by arranging the drive for input motor 208 in accordance with the wiring diagram of FIG. 8, cycle type operation or "pulsing" of the feeder 54 is possible, involving the input motor 208 operating the feeder 54 during furnace "start up" so that its low stroke and dribble type of feed provided for boiler start up is spaced by short bursts of full stroke of the apparatus for full feed of the RDF down the feeder 54 and from the bin 52 to effect a short burst of full feeding of the RDF from bin 52 and lengthwise of the feeder 54, while not overfeeding the furnace boiler fire chamber. The exact time of the duration of the indicated full speed bursts or pulses is established by trial and error in the field. It has been found that the length of such burst or pulse is that time it takes to effect movement of the RDF making up the vertical column of same (that has entered the bin 52) forwardly sufficiently to avoid packing of the RDF within the bin 52, and it appears at present that this pulse period lies in the range of from about 3 to about 5 seconds, separated by operation of the feeder at the very low feed rates or dribble feed rate desired to bring the furnace boiler up to temperature at a time period of from about 1 to about 2 minutes.

In other words, "pulsing" for this application is the temporary or brief application of full voltage to the input motor, with the drive system being electrically wired so that the output of the feeder is raised to its maximum amount, with the voltage then being reduced to provide the drive suitable for boiler start up. After the time duration of the full speed bursts and dribble feed is determined for a particular installation, the pulsing involved can be repeated, if and when the fuel burning system is shut down, by applying same to the electrical programming of a computer, or introducing a cycle timer into conventional electrical control circuits. This same principle may be applied to conveyors 49, for boiler start up, and after boiler start up has been achieved, the operation of conveyors 49 and 52 can be returned to provide the type of feed contemplated by Applicant's said U.S. Pat. No. 4,774,893.

As indicated, pulsing is very beneficial when the furnace boiler is to be first "started up". At that point, the boiler is cold. To avoid excessive expansion rates within the boiler, and probably other considerations, furnace boilers are brought up to temperature very slowly. For example, to raise a boiler's temperature from an ambient of, say, 50 degrees F. to 600 degrees F., it would require a time period of about four hours. Very low fuel vibrating conveyor and feeder outputs would be required the first hour, a slightly higher rate of fuel feed would be required the second hour, etc. In other words, both the distribution conveyor 49 and in particular, the feeders 52 (which ultimately discharge into the boiler feed chutes) must be capable of initially operating at very low feed rates for long periods of time. The continual application of vibratory energy to the RDF fuel contained within, for instance, the feeder 52 for these long periods of time, with little movement of the fuel being obtained, has been found to be detrimental. The contained RDF fuel "densifies" or "packs" as indicated in the showing of FIG. 7. By introducing this "pulsing", the maximum stroke and frequency was more or less instantaneously but periodically applied to the machine to "free up" the packed fuel.

Heretofore, furnace boilers have normally been brought up to operating temperature by the use of more controllable fuel, such as natural gas or oil. However, it has been found that where RDF systems of the type disclosed in Applicant's U.S. Pat. No. 4,774,893 were involved, the operators of same wanted to bring the furnace boilers involved up to operating temperature with RDF fuel.

This pulsing availability is one of the benefits of the "free force input combined with sub-resonant tuned spring" type of vibratory drive system that is to be employed in connection with the conveyors 49 and feeders 54, in accordance with the Applicant's said U.S. Pat. No. 4,774,893. Without this flexibility the fuel feed of RDF over this "warm up" would not be possible.

The showing of FIG. 8 is electrical schematic E-104 recommended by Kinergy Corporation to effect adjustable output for all vibratory feeders offered by that company.

Referring now to the illustrations of FIGS. 7 and 9 with reference to the ramp type obstruction 410 there illustrated, it has been found that occasionally the furnace fire box, pit, or chamber for a boiler 46 operates at a negative air pressure which actually is in the nature of a slight vacuum, resulting in the RDF that is being supplied by a vibrating feeder 54 being drawn by air flow down through the bin 54, along the feeder trough 200, through the discharge opening 412 defined by same, and into the furnace fuel feed chute 48, with the result that control of the RDF feed rate of the feeder 54, by way of vibration, can be in effect lost.

Where this is found to be a problem, the ramp type obstruction 410 is employed upstream of the discharge opening 412 but closely adjacent same, so that the RDF can be moved out of the feeder 54 and through the discharge opening 412 only by vibratory action. This is in addition to the "fluffing" ramping that is disclosed in Applicant's said U.S. Pat. No. 4,774,893 (which is omitted from the showing of FIGS. 7 and 9 of the instant disclosure).

One embodiment of a successful ramp type obstruction is shown in FIGS. 7 and 9 and comprises several inclined ramps 414, 416, and 418, each of which comprises a top ramp plate 420, which is itself of trapizoidal shape, and for the respective ramps 414, 416 and 418, has the leading edge 422 of same of greater width (transversely of the trough 200) than their respective trailing edges 424, with the latter edges 424 being disposed closely adjacent the discharge outlet 412 of the vibrating feeder trough 200 (see FIGS. 7 and 9). The ramp plates 420 of the respective ramps thus taper from a wider dimension at their leading edges 422 to a narrower dimension at their trailing ends or edges 424 with a typical dimension of their leading edges being approximately two inches and the dimension of their trailing edges being approximately one-half inch, in a successful embodiment.

The ramp plates 420 at each ramp 414, 416, and 418 are upwardly angled with respect to the trough floor 227 at an angle of approximately seven and one-half degrees, and are held in the indicated inclined positions by being respectively secured to upright base plates 426 that are suitably centered relative to the respective ramp plates 420.

Thus, the ramps 414, 416 and 418 each involve the upper ramp plates 420 that are respectively shaped to converge in the direction of fuel flow, or in other words, the openings between the ramp plates 420 diverge in the direction of fuel flow, and base plates 426 that respectively support the respective ramp plates 420.

The ramp arrangement shown in FIGS. 7 and 9 is preferred for feeder troughs 200 of which the floor is approximately two feet wide. More or less ramps 420 may be employed as needed to effect the objectives of this improvement.

As indicated, ramps 414, 416, and 418 together form an "obstruction" to the RDF that is being conveyed by the feeder 24; it was found that the air that is drawn down through the bin 52 and along the feeder 54 as a result of a "negative" air pressure within the boiler fire box does not readily draw the RDF up and over the ramp arrangement 410. Since in order to control the feed rate of the feeder 54, the RDF has to be moved only by vibratory action; this is achieved in the instances indicated by forming the ramp obstruction 410 adjacent and upstream of the feeder trough discharge opening 412, so that the RDF flow is moved up and over the ramps involved only by vibration of the feeder 54 (that can be conventionally controlled to keep the desired RDF feed rate).

It will thus be seen that even in installations where drag-flite type conveyors are employed to supply the RDF fuel to the system, the use of the stub baffle arrangements in the storage and supply bins 42 permits a good discharging of the fuel from the bin, at a usable volume of the RDF to the output, and insures that the RDF will have the necessary vertical velocity through the height of the activated bin 42 that is needed to obtain efficient discharge therefrom. This same principle may be applied to bins 52.

Further, application of the cycle type input motor activating arrangement of FIG. 8 to the vibrating feeder input motors 208 permitted the feeders to be operated with a short burst of full stroke timed duration separated by the short throw needed to insure the low fuel feed rates or dribble feed coming out of the RDF, needed for furnace boiler start up. After start up has been completed, the vibrating feeder motors 28 can be operated at a stroke that will provide for the full operation of the feeder, as determined by the starve switches disclosed in the Applicant's said U.S. Pat. No. 4,774,893, and to provide normal operation of the feeders. The same principle may be applied to conveyors 49.

Further, where it is found that the furnace boiler fire box or pit operates at a negative air pressure, application of the ramp obstruction 410 to the feeder 54 adjacent but upstream of its discharge opening 412 avoids loss of control of the feeder feed rate while permitting efficient discharge of the RDF through the feeder discharge aperture 412 into the furnace fuel feed chamber 48 that is involved.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

What is claimed is:

1. In apparatus for supplying refuse derived fuel, that has been shredded to a predetermined nominal size, to a furnace fuel feed chute that is open to the furnace fire chamber, in a continuous and uninterrupted flow, for burning of such fuel in the furnace fire chamber, said apparatus comprising:
an activated bin defining an essentially vertical central axis,
said bin including an upper intake port and a lower discharge port aligned with said axis,
said bin having a plurality of vertically spaced baffle arrangements that are each essentially centered on said axis and are characterized by being open along said axis,
means for continuously storing the fuel in said bin through said intake port at a rate that is substantially in excess of the flow rate of said flow,
means for periodically actuating said bin to vibrate for feeding from the stored fuel quantity through said discharge port the fuel at a predetermined lesser flow rate, and
fuel distributing conveyor means below said primary bin and including means for receiving the fuel from said primary bin discharge port at said lesser flow rate and means for conveying the fuel to and into the furnace fuel supply chute.

2. The apparatus set forth in claim 1 wherein:
at least some of said baffle arrangements are of stub length relation to said axis.

3. The apparatus set forth in claim 1 wherein:
at least some of said baffle arrangements are staggered about said axis.

4. The apparatus set forth in claim 1 wherein:
said baffle arrangements each comprise stub baffles directed toward said axis.

5. The apparatus set forth in claim 1 wherein said stub baffles of said baffle arrangements are progressively longer downwardly of said axis.

6. The apparatus set forth in claim 5 wherein at least some of said baffle arrangements are winged.

7. The apparatus set forth in claim 1 including:
essentially horizontal, drag-flite type conveyor means mounted above and supplying the fuel to said bin upper intake port.

8. In apparatus for supplying refuse derived fuel, that has been shredded to a predetermined nominal size, to a furnace fuel feed chute that is open to the furnace fire chamber, in a continuous and uninterrupted flow, for burning of such fuel in the furnace fire chamber, said apparatus comprising:
an activated bin defining an essentially vertical central axis,
said bin including an upper intake port and a lower discharge port that are essentially aligned with said axis,
means for continuously storing the fuel in said bin through said intake port at a rate that is substantially in excess of the flow rate of said flow,
means for periodically vibrating said bin for feeding from the stored fuel quantity through said discharge port the fuel at a predetermined lesser flow rate,
fuel distributing conveyor means below said bin and comprising a vibrating feeder including means for receiving the fuel from said bin discharge port at said lesser flow rate and including a fuel flow conducting trough for vibrationally conveying such fuel flow received from said bin,
and means for conveying the fuel flow of said trough to and into the furnace fuel supply chute,
said conveying means including means for pulse actuating said feeder during start up of the furnace.

9. The apparatus set forth in claim 8 wherein said pulse actuating means effects full stroke feeding action for a time period in the rage of from about three to about five seconds and a dribble type feeding action in the rage of from about one minute to about two minutes.

10. In apparatus for supplying refuse derived fuel, that has been shredded to a predetermined nominal size, to a furnace fuel feed chute that is open to the furnace fire chamber, in a continuous and uninterrupted flow, for burning of such fuel in the furnace fire chamber, said apparatus comprising:

an activated bin, said bin including an upper intake port and a lower discharge port, means for continuously storing the fuel in said bin through said intake port at a rate that is in excess of the flow rate of said flow, means for periodically actuating said bin to vibrate for feeding from the stored fuel quantity thereof through said discharge port the fuel at a predetermined lesser flow rate, fuel distributing conveyor means below said bin and comprising a vibrating feeder including means for receiving the fuel from said bin discharge port at said lesser flow rate and including a fuel flow conducting trough for vibrationally conveying such fuel flow received from said bin to and into the furnace fuel feed chute, said vibrating feeder having a drive system of the free force input combined with sub-resonant tuned spring type, said feed having a discharge port formed in said trough over the furnace feed chute, said vibrating feeder trough including spaced apart ramp means upstream of said port in blocking relation to the fuel flow therein, whereby said ramp means obstructs the fuel flow into said discharge port for improved feed rate control.

11. The apparatus set forth in claim 9 wherein:

said ramp means comprises several ramps in side-by-side relation inclined approximately seven and one-half degrees relative to the floor of said trough.

12. The method of continuously supplying refuse derived fuel (RDF) that has been shredded to a predetermined nominal size, to and into the fuel feed chute of a furnace fire chamber, in a continuous and uninterrupted final fuel flow that is free of pulsation for burning of such fuel in the furnace fire chamber, said method comprising:

establishing a first body of said fuel that is open centered about an essentially vertical first axis and is of sufficient volumetric quantity to serve as primary surge capacity storage of such fuel, supplying to said body additional of said fuel in sufficient quantity to maintain the primary storage capacity of said first body, periodically subjecting said fuel body, as a whole, to a period of vibration having an oscillation resultant that includes as a component vibratory motion about said vertical axis and thereby orienting the components making up the fuel of said fuel body in horizontal layers and discharging therefrom a first flow of said fuel, vibrationally conveying the first fuel flow to the locale of the furnace and binning such fuel flow into the form of a second fuel body that is open centered about an essentially vertical second axis and is of lesser quantity than that of said first body, periodically subjecting said second fuel body, as a whole, to a period of vibration having an oscillation resultant that includes as a component vibratory motion about said second vertical axis and thereby orienting the components making up the fuel of said second fuel body in horizontal layers and discharge therefrom a second flow of said fuel, vibrationally feeding the second fuel flow to the fuel feed chute at a feed rate that is automatically controlled to form the continuous and uninterrupted flow of same that is free of pulsation, and discharging said final fuel flow into the fuel feed chute.

13. The method set forth in claim 12 wherein:

the conveying of said first fuel flow in practicing said vibrational conveying step is effected employing a vibrating conveyor which has a drive system of the free force input combined with sub-resonant tuned springs type.

14. The method set forth in claim 12 wherein:

the feeding of said second fuel flow in practicing said vibrational feeding step is effected employing a vibrating feeder which has a drive system of the free force input combined with subresonant tuned spring type.

15. The method of continuously supplying refuse derived fuel (RDF) that has been shredded to a predetermined nominal size, to and into the fuel feed chute of a furnace fire chamber for furnace start up purposes, said method comprising:

establishing a first body of said fuel that is oriented about an essentially vertical first axis and is of sufficient volumetric quantity to serve as primary surge capacity storage of such fuel, supplying to said body additional of said fuel in sufficient quantity to maintain the primary storage capacity of said first body, periodically subjecting said fuel body, as a whole, to a period of vibration having an oscillation resultant that includes as a component vibratory motion about said vertical axis and thereby orienting the components making up the fuel of said fuel body in horizontal layers and discharging therefrom a first flow of said fuel, vibrationally conveying, using pulse vibration having both full stroke and dribble feed action, the first fuel flow to the locale of the furnace and binning such fuel flow into the form of a second fuel body that is oriented about an essentially vertical second axis and is of lesser quantity that that of said first body, periodically subjecting said second fuel body, as a whole, to a period of vibration having an oscillation resultant that includes as a component vibratory motion about said second vertical axis and thereby orienting the components making up the fuel of said second fuel body in horizontal layers and discharge therefrom a second flow of said fuel, vibrationally feeding, using pulse vibration having both full stroke and dribble feed action, the second fuel flow to the fuel feed chute, and discharging said final fuel flow into the fuel feed chute for and during boiler start up.

16. The method set forth in claim 15 wherein:

the conveying of said first fuel flow in practicing said vibrational conveying step is effected employing a vibrating conveyor which has a drive system of the free force input combined with sub-resonant tuned springs type.

17. The method set forth in claim 15 wherein:

the feeding of said second fuel flow in practicing said vibrational feeding step is effected employing a vibrating feeder which has a drive system of the free force input combined with subresonant tuned spring type.

18. The method of continuously supplying refuse derived fuel (RDF) that has been shredded to a predetermined nominal size, to and into the fuel feed chute of a furnace fire chamber, in a continuous and uninterrupted final fuel flow that is free of pulsation for burning of such fuel in the furnace fire chamber, said method comprising:

establishing a first body of said fuel that is oriented about an essentially vertical first axis and is of sufficient volumetric quantity to serve as primary surge capacity storage of such fuel, supplying to said body additional of said fuel in sufficient quantity to maintain the primary storage capacity of said first body, periodically subjecting said fuel body, as a whole, to a period of vibration having an oscillation resultant that includes as a component vibratory motion about said vertical axis and thereby orienting the components making up the fuel of said fuel body in horizontal layers and discharging therefrom a first flow of said fuel, vibrationally conveying the first fuel flow to the locale of the furnace and binning such fuel flow into the form of a second fuel body that is oriented about an essentially vertical second axis and is of lesser quantity than that of said first body, periodically subjecting said second fuel body, as a whole, to a period of vibration having an oscillation resultant that includes as a component vibratory motion about said second vertical axis and thereby orienting the components making up the fuel of said second fuel body in horizontal layers and discharge therefrom a second flow of said fuel, vibrationally feeding the second fuel flow to the fuel feed chute at a feed rate that is obstructed adjacent but upstream of the feed chute to insure that second fuel flow is effected only by vibration, and discharging said final fuel flow into the fuel feed chute free of negative air pressure within the fuel feed chute.

19. The method set forth in claim 18 wherein:

in practicing the step of vibrationally feeding the second fuel flow, the obstruction is obtained by ramping the second fuel flow prior to discharging same into the fuel feed chute.

* * * * *